United States Patent
Braid

[15] 3,644,206
[45] Feb. 22, 1972

[54] LUBRICATING OILS OR FUELS CONTAINING ADDUCTS OF PHOSPHORODITHIOATE ESTERS

[72] Inventor: Milton Braid, Westmont, N.J.

[73] Assignee: Mobil Oil Corporation

[22] Filed: Nov. 14, 1968

[21] Appl. No.: 775,916

[52] U.S. Cl..............................252/46.7, 252/46.6, 252/400, 44/76, 260/953
[51] Int. Cl. .......................................................C10m 1/48
[58] Field of Search ...............252/46.6, 46.7, 400; 260/953; 44/76, DIG. 4

[56] References Cited

UNITED STATES PATENTS

| | | | |
|---|---|---|---|
| 2,758,971 | 8/1956 | Mikeska | 252/32.7 |
| 2,948,682 | 8/1960 | Crosby et al. | 252/46.6 |
| 3,197,496 | 7/1965 | Le Suer | 252/46.6 X |

*Primary Examiner*—Daniel E. Wyman
*Assistant Examiner*—W. Cannon
*Attorney*—Oswald G. Hayes, Andrew L. Gaboriault, Raymond W. Barclay and Stanley A. Strober

[57] ABSTRACT

Reaction between diorganophosphorodithioate esters and hindered aldehydes, i.e. those having no alpha-hydrogen atoms, produce products having antioxidant and thermal stability characteristics. Such products would be effective in organic base media, such as lubricating oils. The reaction is one of addition rather than condensation.

11 Claims, No Drawings

LUBRICATING OILS OR FUELS CONTAINING ADDUCTS OF PHOSPHORODITHIOATE ESTERS

BACKGROUND OF THE INVENTION

1. Field of the Invention

This invention relates to novel phosphorus-containing compounds and in particular, it relates to phosphorodithioate-aldehyde reaction products.

2. Description of the Prior Art

U.S. Pat. No. 2,948,682 describes the reaction between phosphorodithioate esters and unsaturated aldehydes which occurs around the double bond of the unsaturated aldehyde. The remaining product retains the aldehyde group. These products are said to have antiwear properties. U.S. Pat. No. 2,736,706, discloses a phosphorodithioate-formaldehyde reaction product. The reaction products are said to be lubricant additives. These products, however, lack sufficient resistance to heat, dehydration and oxidation under the arduous conditions found in present-day uses for such additives.

SUMMARY OF THE INVENTION

It has now been discovered that novel antioxidants for organic base media having improved thermal stability and resistance to dehydration are obtained by reacting phosphorodithioate esters with hindered aldehydes.

DESCRIPTION OF SPECIFIC EMBODIMENTS

Broadly, this invention has to do with a product of a phosphorodithioate ester, having the structure

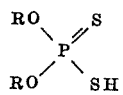

wherein each R is a hydrocarbyl or substituted hydrocarbyl radical having from one to about 35 carbon atoms, with an aldehyde having no alpha-hydrogen atoms. Preferably the aldehydes have the structures

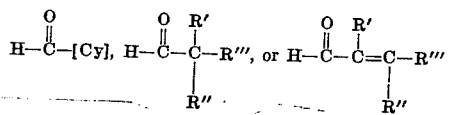

wherein Cy is a cyclic radical including an aromatic radical, a cyclic alkenyl radical, substituted cyclic alkyl radical or a heterocyclic radical; and the R', R'' and R''' are hydrocarbyl groups, such as alkyl, cycloalkyl, aralkyl, aryl, and alkaryl, each having from one to 20, and preferably one to 10, alkyl carbon atoms, and these groups may be the same as each other or different. R, R', R'' and R''' may also be substituted by halogen atoms, hydroxy groups, alkoxy groups, amino groups, nitro groups, alkylthio groups, cyano groups, and the like. The reaction of this invention is believed to occur at the carbonyl group of the aldehyde in an addition reaction. Condensation does not occur, since the product no longer contains a carbonyl group, and the formation of water as a side product is not observed.

The phosphorodithioate esters used in accordance with this invention prepared by well-known means. Hydroxyl compounds, including phenols, naphthols and alcohols, are reacted with phosphorus pentasulfide:

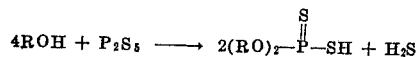

wherein R has been previously defined. By employing different alcohols or phenols in this reaction, the R groups may be different. R may therefore be alkyl, cycloalkyl, haloalkyl, aralkyl, or alkenyl containing from one to 35 and preferably one to 20, carbon atoms or aryl or alkaryl, containing from one to about 35 carbon atoms in the alkyl substituent. Such alcohols as methanol, ethanol, propanol, butanol, cyclohexanol, octanol, decanol, octadecanol, benzyl alcohol, and the like, including any isomeric forms thereof, represent the suitable alcohols; phenol, cresol, nonylphenol, naphthol and the alkyl derivatives thereof represent the hydroxy aromatic compounds. Halogen and other substituents previously mentioned may be present in these compounds.

The aldehydes used in this invention are hindered, in which the carbon atom attached to the carbonyl carbon contains no hydrogen atoms. Thus, the 2-carbon atoms may be a member of an aromatic nucleus. Benzaldehyde, naphthoic aldehyde, anthraldehyde, and substituted derivatives thereof, such as salicylaldehyde, tolualdehyde, aminobenzaldehyde, thymolaldehyde, anisaldehyde, bromobenzaldehyde, dichlorobenzaldehyde, and so forth, are contemplated as suitable for this invention. As for the nonaromatic aldehydes, suitable representatives include the 2,2-substituted aldehydes, such as 2,2-dimethylpropionaldehyde, 2,2-dimethylbutyraldehyde, 2-methyl-2-ethylbutyraldehyde, 2,2-dimethylvaleraldehyde, 2,2,4-trimethylvaleraldehyde and the like.

The cyclic aldehydes include cycloalkenyl aldehydes having one or more unsaturated bonds, in which the carbonyl group is attached to an unsaturated carbon atom. Typical of this class are cyclopentyl, cyclohexyl, cyclohexadienyl and the like, as in:

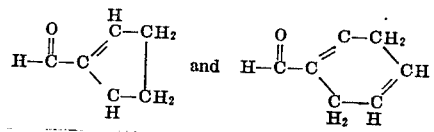

the heterocyclic aldehydes, as represented by those containing pyridyl, unsaturated piperidyl and pyrrolidyl, furyl, and thiophenyl:

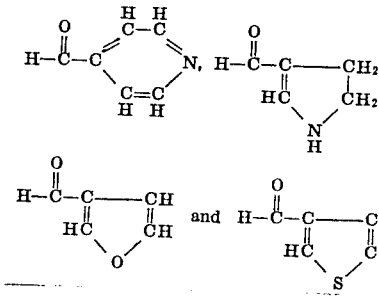

and the alpha-substituted cycloalkyl aldehydes including

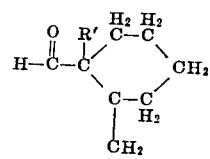

These cyclic classes may be further substituted by alkyl groups of one to 10 carbon atoms. As with the phosphorodithioate reactant, other functional groups may appear on the aldehyde, including halogen atoms, hydroxy, alkoxy, amino, nitro, organo-thio, and cyano groups. Such non-organo-substituted aldehydes as 2,2-dimethyl-3-hydroxy-propionaldehyde, 2-methyl-2-ethyl-4-chloro-caproaldehyde and the like fall within the class of aldehydes suitable for this invention. One aldehyde of particular interest in this invention is 4-cyano-2,2-dimethylbutyraldehyde, which provides excellent reaction products.

The reaction between the aldehyde and the phosphorodithioate ester simply involves the mixing of the two components aloe or in the presence of an inert organic solvent, such as benzene, toluene, hexane and the like. The reaction mixture is usually maintained at a moderate temperature, preferably in the range of from about 20° to about 150° C. The reaction appears to involve an equal number of moles of the phosphorodithioate and of the aldehyde. Product analysis shows this 1:1 ratio regardless of whether the phosphorodithioate ester is added to the aldehyde reactant or the reverse additive is employed. The molar ratio of reactants may range from about 0.5 to about 2:1 of the phosphorodithioate to the aldehyde, preferably 1:1. The specific structure of the reaction product cannot be determined with certainty, however it is believed to be the carbonyl adduct.

The reaction products of this invention may be used in a number of organic fluids and solids to prevent the oxidation deterioration thereof. Primarily, these additives are used in lubricating oils, such as petroleum mineral oils, and synthetic hydrocarbon oils, such as long-chain alkane fluids, olefin-derived fluids, and polymers thereof. Also suitable as the base media are synthetic ester fluids, particularly esters of monocarboxylic acids and hindered polyols, such as neopentyl glycol, trimethylolpropane and pentaerythritol, wherein the monocarboxylic acids have from two to about 20 carbon atoms. Other fluids which may be used as lubricants or industrial media include polyglycol ethers, polyphenyl ethers, silicone fluids, polyacetals and so forth. Hydrocarbon fuels may also require antioxidant protection, such as the petroleum base fuels, i.e., gasoline, kerosene and heavier fuel oils. Polymers of polyolefins, such as polyvinyl chloride, polystyrene and polyisobutylene, may also be prone to oxidative attack. The novel additives of this invention are useful in reducing oxidative deterioration in the above-mentioned media at concentrations of from 0.05 to about 40 percent by weight; for lubricants and fuels, the concentration is preferably from about 0.1 to about 10 percent by weight; for other organic media, the concentration may be higher.

Having described the invention in broad terms, the following examples illustrate the preferred embodiments of the invention, all parts and percentages are on a weight basis.

EXAMPLE 1

To a solution of 62.5 g. (0.5 mole) of 4-cyano-2,2-dimethyl-butyraldehyde in 200 ml. of benzene there is added while stirring at 68° to 70° C. during 1 hour, 130 g. (0.5 mole) of crude 0,0-di-n-butylphosphorodithioate. After the addition is completed the reaction mixture is stirred at 68° to 70° C. for a total of 5 hours. The reaction mixture is then subjected to reduced pressure distillation to remove solvent and remaining reactants. There remains 189 g. of a reddish clear liquid addition product.

Anal. Calc'd. for the 1:1 addition product P, 8.44; S, 17.5; N, 3.81

Found P, 8.54; S, 17.6; N, 3.52

EXAMPLE 2

To a solution of 130 g. (0.5 mole) of crude di-n-butylphosphorodithioate in 200 ml. of benzene there is added while stirring during about 1 hour 62.5 g. (0.5 mole) of 4-cyano-2,2-dimethylbutyraldehyde. The temperature is maintained at 38° to 40° C. during the addition by ice bath cooling and the reaction mixture is then stirred at 40° to 50° C. for an additional 1.75 hr. The reaction mixture is washed with 20 percent sodium carbonate solution. The organic layer is then washed with water, dried and distilled under reduced pressure to remove solvent and remaining reactants. The addition product remains as a clear amber liquid.

Anal. Calc'd. for a 1:1 adduct: P, 8.44; S, 17.5 N, 3.81

Found: P, 8.29; S, 17.6; N, 3.38

EXAMPLE 3

To a solution of 62.5 g. (0.5 mole) of 4-cyano-2,2-dimethyl-butyraldehyde in 200 ml. of benzene there is added during 1.75 hr. while stirring at 35° to 40° C. 165 g. (0.53 mole) of 0,0-ditolylphosphorodithioate. The reaction mixture is stirred at 40° to 50° for an additional 1.25 hr. and then washed with 20 percent sodium carbonate solution. The organic layer was washed with water, dried, and distilled under reduced pressure to remove solvent and unreacted aldehyde. There remained a brown very viscous liquid consisting mostly of the addition product.

Anal. Found: P, 0.6; S, 11.8; N, 4.32

EXAMPLE 4

To a solution of 160.4 g. (0.3 mole) of 0,0-di-(nonylphenyl)phosphorodithioate in 100 ml. of dry benzene there is added during 0.25 hr. while stirring at 45° to 50° C. 31.8 g. (0.3 mole) of benzaldehyde. The reaction mixture was stirred for one additional hour and stripped of solvent under reduced pressure. The residue was filtered to remove some solids and afford, as the filtrate, the addition product.

Anal. Calc'd. P, 4.82

Found: P, 4.37

EVALUATION OF PRODUCTS

The products of this invention were evaluated as antioxidants in a mineral oil stock at a number of concentrations. The oil is a solvent refined mineral oil. In the oxidation test, air is passed through an oil sample containing the additive at the rate of 5 liters per hour for 40 hours. The temperature of the sample is held at 325° F. Present in the oil are samples of iron, copper, lead and aluminum. The neutralization number and the kinematic viscosity of the oil sample (at 210° F.) are measured before the test and afterward to determine increase in acidity, in thickening and sludge formation caused by oxidation of the oil. The lead sample is weighed before and after the test to measure any weight loss, as a further indication of the effects of oxidation. The following results were obtained:

| Additive | Conc. Wt.% | ΔNN | Percent KV Increase | Lead Loss mg |
|---|---|---|---|---|
| None | — | 17.0 | 230 | 39 |
| Product of Example 1 | 1.0 | 0.27 | 17 | 11 |
|  | 0.5 | 3.53 | 21 | 23 |
|  | 0.25 | 9.71 | 61 | 4.0 |
| Product of Example 2 | 1.0 | 0.53 | 12 | 5.0 |
|  | 0.5 | 9.66 | 78 | 38.0 |
|  | 0.25 | 13.48 | 93 | 28.0 |
| Product of Example 1 +3% of a boronated ashless detergent | 1.0 | 6.73 | 27 | 1.0 |
|  | 0.5 | 7.01 | 40 | 3.0 |
|  | 0.25 | 10.55 | 180 | 7.0 |
| Product of Example 3 | <1 | 4.65 | 55 | 4.0 |

It may thus be seen that the additives of this invention impart antioxidant protection to organic base media. Moreover, they may be used in the presence of other additives, such as detergents, viscosity improving agents, pour point depressants, and extreme pressure agents.

Modifications and variations of the invention hereinabove set forth may be made without departing from the spirit of the invention, which is only limited by the following claims:

I claim:

1. An organic composition containing a major proportion of lubricating oil or a liquid hydrocarbon fuel and an amount sufficient to inhibit oxidation thereof of the product of reaction between a dihydrocarbyl phosphorodithioate and a hindered aldehyde having no alphahydrogen atom, the aldehyde being selected from the formulas

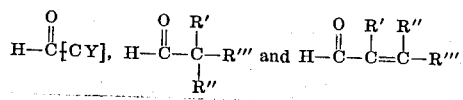

wherein CY is selected from the group consisting of aryl and cycloalkyl wherein in the latter and carbon atom attached to the carbonyl contains an R', R', R'' and R''' are individually selected from the group consisting of (1) alkyl, aralkyl, cycloalkyl, aryl and alkaryl having from one to about 20 carbon atoms and (2) the members of (1) containing substituents selected from the group consisting of hydroxy, halo, nitro, amino, alkylthio and cyano.

2. The organic composition of claim 1 wherein the said lubricant is a lubricating oil.

3. The composition of claim 2 wherein the lubricating oil is a mineral oil.

4. The composition of claim 2 wherein the lubricating oil is a synthetic oil.

5. The composition of claim 4 wherein the synthetic oil is a pentaerythritol ester.

6. The composition of claim 1 wherein the aldehyde is 4-cyano-2,2-dimethylbutyraldehyde.

7. The composition of claim 1 wherein the aldehyde is benzaldehyde.

8. The composition of claim 1 wherein the phosphorodithioate has the structure

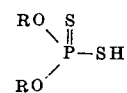

wherein each R is individually selected from the group consisting of (1) alkyl, aralkyl, cycloalkyl and alkenyl having from one to about 35 carbon atoms and (2) aryl and alkaryl, the said alkaryl having from one to about 35 carbon atoms in the alkyl portion.

9. The composition of claim 8 wherein each R is butyl.

10. The composition of claim 8 wherein each R is tolyl.

11. The composition of claim 8 wherein each R is nonylphenyl.

* * * * *

PO-1050
(5/69)

UNITED STATES PATENT OFFICE
CERTIFICATE OF CORRECTION

Patent No. 3,644,206  Dated February 22, 1972

Inventor(s) MILTON BRAID

It is certified that error appears in the above-identified patent and that said Letters Patent are hereby corrected as shown below:

Column 4, line 6, "P,0.6" should be --P,5.06--

Signed and sealed this 13th day of June 1972.

(SEAL)
Attest:

EDWARD M. FLETCHER, JR.
Attesting Officer

ROBERT GOTTSCHALK
Commissioner of Patents